United States Patent [19]
Egan et al.

[11] 3,836,237
[45] Sept. 17, 1974

[54] WINDOW ASSEMBLY FOR USE WITH A STACK MONITOR

[75] Inventors: Dale W. Egan, Montrose; Geoffrey B. Holstrom, Los Angeles; Harry C. Lord, Pasadena; Robert W. Stevens, San Dimas; Darrell P. Port, La Crescenta; Rollen D. Howard, La Canada, all of Calif.

[73] Assignee: Environmental Data Corporation, Monrovia, Calif.

[22] Filed: Apr. 25, 1973

[21] Appl. No.: 354,160

Related U.S. Application Data

[62] Division of Ser. No. 158,885, July 1, 1974, abandoned.

[52] U.S. Cl.................. 350/319, 356/97, 356/244
[51] Int. Cl. ........................................ G02b 27/00
[58] Field of Search ........ 350/319, 63, 65; 356/244; 126/200

[56] References Cited
UNITED STATES PATENTS

| | | | |
|---|---|---|---|
| 3,170,383 | 2/1965 | Hunt | 350/63 X |
| 3,340,890 | 9/1967 | Raskhodoff | 350/319 UX |
| 3,385,285 | 5/1968 | King | 350/319 UX |
| 3,565,516 | 2/1971 | Thomas et al. | 350/319 |

*Primary Examiner*—John K. Corbin
*Attorney, Agent, or Firm*—D. Gordon Angus; Donald D. Mon

[57] ABSTRACT

The present disclosure relates to spectrometry. A method is disclosed for detecting nitric oxide (NO) without first converting it to nitrogen dioxide ($NO_2$) by determining the intensity of a spectral signature in the range between about 2259 and 2269 Angstroms. Apparatus is provided which, in one form, utilizes an output shutter arrangement having a plurality of reciprocating vanes operated at mutually exclusive frequencies for passing regions of absorption radiation and continuum radiation. Circuit means is provided for distinguishing the signals derived at the various frequencies to determine the relative amount of particular material in a sample. In another form of the invention, an output chopper is provided having at least three slit apertures, the center aperture being adapted to pass only radiation at an absorption wavelength and the two outer apertures being adapted to pass radiation in the continuum. A vane is adapted to reciprocate between a first position wherein the chopper passes only radiation through the center aperture and a second position wherein the chopper passes only radiation through the two outer apertures. The area of each of the two outer apertures is preferably one-half the area of the center aperture. A detector viewing radiation passed by the chopper will average the radiation received from the two outer apertures. In yet another aspect of the invention, a window assembly is provided so that the spectrometer may be used as a stack monitor, the window assembly having a slidable window which may be removed for cleaning purposes.

3 Claims, 19 Drawing Figures

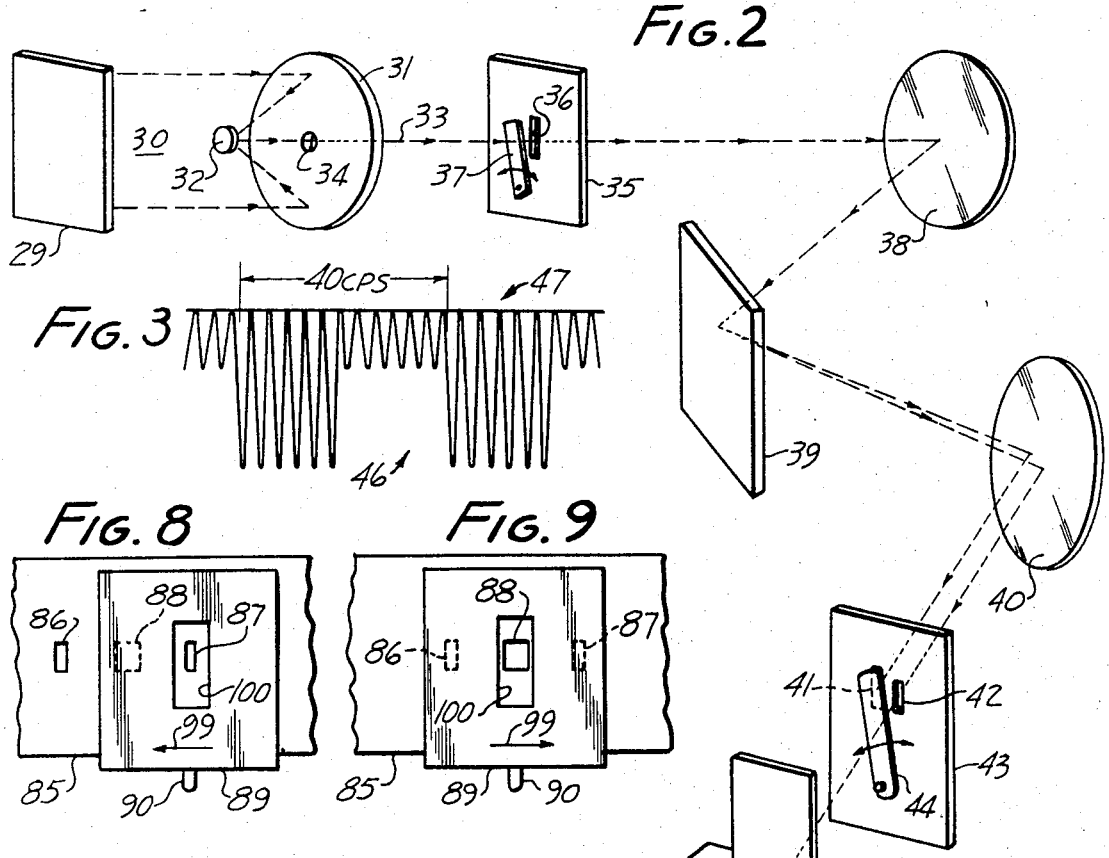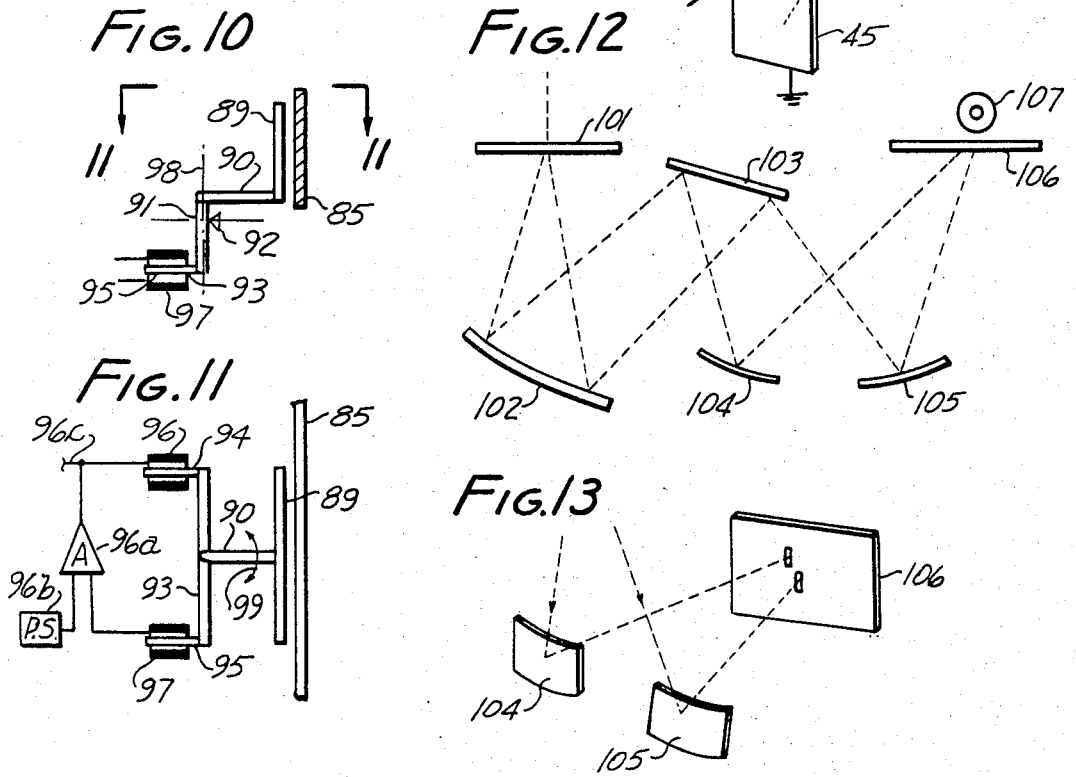

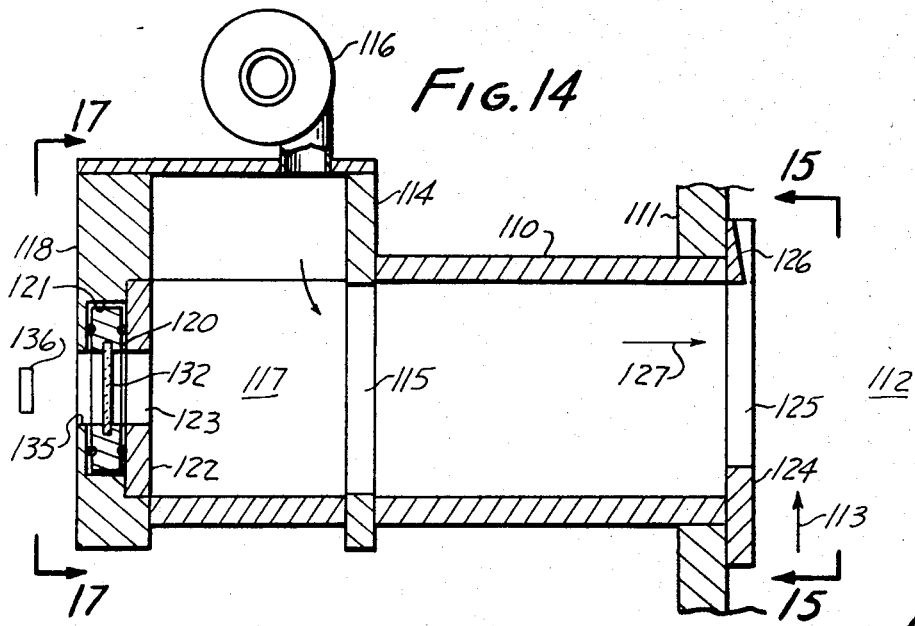
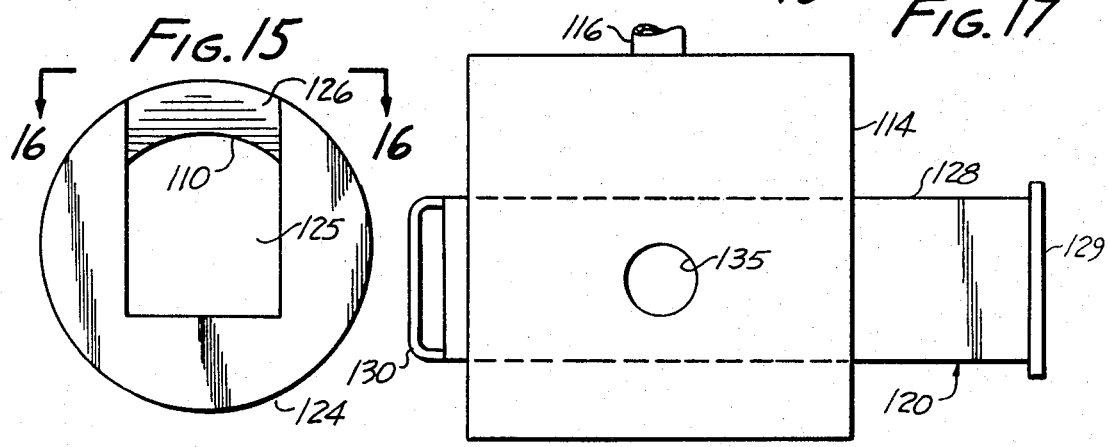
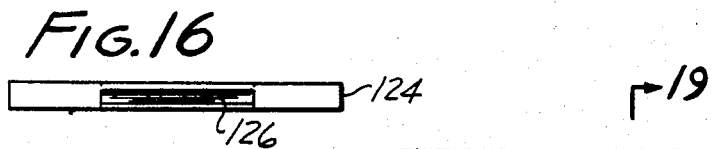
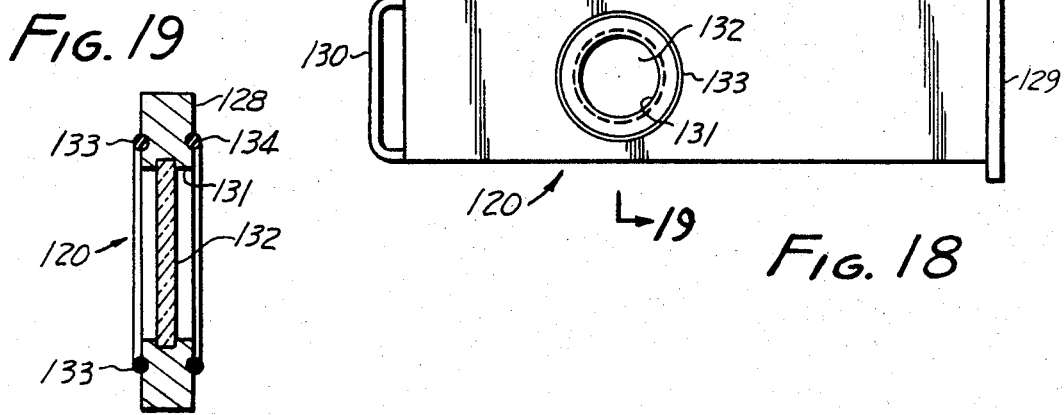

WINDOW ASSEMBLY FOR USE WITH A STACK MONITOR

This is a division of application Ser. No. 158,885, filed July 1, 1971, now abandoned.

This invention relates to spectrometry, and particularly to spectrometric apparatus for analysis of gas and liquids to determine the presence and quantity of specific materials, such as pollutants.

It is well known that atoms and molecules absorb or emit radiation at specific frequencies. In the case of absorption or radiation, the specific frequencies at which radiation is absorbed by a particular material are called the "absorption frequencies" and all other frequencies (between absorption frequencies) are called "continuum frequencies."

It has been common to determine the constituent parts of material by spectrometric analysis whereby radiation passed through a material is analyzed to determine the frequencies absorbed. Each molecular composition of matter has its own identifiable signature of absorption frequencies, and by displaying such frequencies upon a grating device, absorption lines are displayed, the pattern of such lines constituting the spectrometric signature of the particular molecular composition. Although the present invention will be described in connection with radiation absorption, it is to be understood that the present invention is equally applicable for analysis of Raman scattering as well.

Heretofore, industrial spectrometers for use in gas analysis have utilized broadband radiation which was passed through the gas sample and thereafter analyzed for absorption lines. When apparatus was utilized for detecting the presence of or quantity of a particular gas which may or may not be present in a gas sample, some difficulty has arisen by virtue of the fact that other gases may have some of the same absorption lines as the gas being monitored. To overcome this problem, more sophisticated apparatus has been proposed to distinguish between gases having some of the same absorption lines.

In the co-pending application of Egan et al., Ser. No. 858,802 filed Sept. 17, 1969 for "Spectrometers," and assigned to the same assignee as the present application, there is described apparatus utilizing a first set of slit apertures for passing absorption lines and a second set of slit apertures for passing continuum lines. Means is provided for alternately observing radiation passed through the absorption and continuum slits, and detectors adjacent the apertures are positioned so that a ratio is obtained of absorption-to-continuum intensity to determine the presence and quantity of particular gases.

Spectrometric apparatus have been utilized as "stack monitors" to monitor the emission of noxious materials and gases into the air. Such stack monitors are ordinarily utilized for long-term commercial applications to determine the emission of specific pollutants, such as hydrocarbons, nitric oxide (NO) nitrogen dioxide ($NO_2$), and sulfur dioxide ($SO_2$), to name a few. It is to the commercial application of the monitoring of pollutants that the present invention is directed.

One of the difficulties in commercially measuring nitric oxide (NO) has resulted from the fact that the spectral signature of nitric oxide overlaps other gases, such as sulfur dioxide, oxide water and hydrocarbons, and nitric oxide is seldom present without nitrogen dioxide, sulfur dioxide and other gases. Heretofore, to distinguish between nitric oxide and sulfur oxide, it has been common to react the nitric oxide with oxygen to form nitrogen dioxide ($NO_2$) and thereafter monitor for the presence of the nitrogen dioxide. However, erroneous indications of the quantity of nitric oxide have resulted from the reaction to nitrogen dioxide and the oxidizing agent, mainly due to the fact that the reaction is not always quantitative. Another technique has been to raise nitric oxide to an excited state by a chemilumenescence process and detect emission radiation at certain frequencies. However, chemilumenscence reaction of nitric oxide requires a reaction of nitric oxide which is not always quantitative and often results in error.

Another problem associated with the use of spectrometers for detecting specific materials in gases has resulted in the fact that the intensity of background radiation in the spectral signature may vary over the frequency range of the analysis. Hence, an erroneous result may occur if the intensity of absorption radiation is measured at one absorption line of a spectral signature and the intensity of the background radiation is measured in the continuum adjacent the absorption line. The erroneous measurement may occur because the intensity of the background radiation in the continuum adjacent the absorption line may be different from the intensity of the background radiation at the absorption line. Hence, it is desirable, and the present invention makes possible, the approximation of the intensity of background radiation at the absorption line.

Another problem relating to prior spectrometric apparatus resides in the fact that a chopper is often used to alternately chop, or pass, radiation through different exit slits. Where exist slits are relatively close together, as might occur where alternate measurements in the continuum are to be made close to the wavelength of an absorption line under investigation, it has been the practice to optically separate the displays of the continuum and absorption regions so that a chopper can effectively alternately chop the radiation passed by the exit slits. However, optional separation often results in affecting the intensity of one or the other regions. One solution to this problem is set forth in the aforementioned Egan et al application whereby the exit slits are offset and the chopper reciprocates in a normal direction to alternatively block the slits. However, where a point source of radiation is utilized, for example an arc discharge lamp, it is not always possible to obtain an image which is capable of encompassing both offset sets of slits. Hence, it is desirable to provide, and the present invention makes possible, a chopper which will alternately block side-by-side exit slits which are spaced close together to pass images at wavelengths close to each other.

It is an object of the present invention to provide a method and apparatus for detection of the presence and quantity of nitric oxide (NO) without first reacting the gas.

Another object of the present invention is to provide spectrometric apparatus capable of determining the intensity of the background radiation at the same frequency as an absorption line being investigated.

Another object of the present invention resides in the provision of apparatus for broad band discrimination of unwanted signals.

Another object of the present invention is to permit the utilization of a point source, such as an arc source, and the provision of a chopper for alternately chopping side by side slits.

Yet another object of the present invention is to provide apparatus for use in spectrometric monitoring of gases and fluids wherein detectors and windows exposed to the sample under investigation may be removed without affecting the sample, or the apparatus.

In accordance with the present invention, spectrometric apparatus includes an output mask having a first slit aperture for passage of radiation associated with absorption lines under investigation, and having a plurality of second slit apertures for passage of radiation associated with the continuum. The location of the second slit apertures is such that at least one of the second slit apertures will pass radiation at an intensity higher than the background intensity at the absorption frequency, and another second slit aperture passes radiation at an intensity lower than the background intensity at the absorption frequency. Means is provided for alternately exposing the first and second slit apertures.

One feature of the present invention resides in the monitoring of nitric oxide (NO) without first reacting it to form nitrogen dioxide ($NO_2$).

Another feature of the present invention resides in the monitoring of nitric oxide at a wavelength in the region between about 2259 and 2269 Angstroms.

Another feature of the present invention resides in the provisions of a window means for use with a stack monitor for spectral analysis of gases passing through the stack, the window means being provided with means whereby the window may be removed and cleaned.

Yet another feature of the present invention resides in the provision of circuitry associated with spectrometric apparatus for determining the ratio of intensity of absorption radiation to the intensity of background radiation.

The above and other features of this invention will be more fully understood from the following detailed description and the accompanying drawings, in which:

FIG. 2 is a perspective diagram of spectrometric apparatus in accordance with the presently preferred embodiment of the present invention;

FIG. 3 is a representation of an electric signal derived by the apparatus illustrated in FIG. 2;

FIGS. 8 and 9 are planar elevations of an output mask apparatus with a modification of the present invention;

FIG. 10 is a side view elevation of the mask apparatus illustrated in FIGS. 8 and 9, together with a drive mechanism;

FIG. 11 is a top view of the apparatus illustrated in FIG. 10, taken at line 11—11 in FIG. 10;

FIG. 12 is a diagrammatic top view elevation of a spectrometer in accordance with another modification of the present invention;

FIG. 13 is a perspective view of part of the spectrometer apparatus illustrated in FIG. 12;

FIG. 14 is a side view elevation, in cutaway cross-section, of removable window apparatus for use in a stack monitor utilizing a spectrometer in accordance with the present invention;

FIG. 15 is an end view elevation of the window apparatus illustrated in FIG. 14 taken at line 15—15 in FIG. 14;

FIG. 16 is a top view elevation of a portion of the window apparatus illustrated in FIGS. 14 and 15 taken at lines 16—16 in FIG. 15;

FIG. 17 is an end view elevation of the window apparatus taken at lines 17—17 in FIG. 14;

FIG. 18 is a planar elevation of a window slide for use in the window apparatus illustrated in FIG. 14; and FIG. 19 is a section view of the window slide illustrated in FIG. 18 taken at line 19—19 in FIG. 18.

Figure 1:
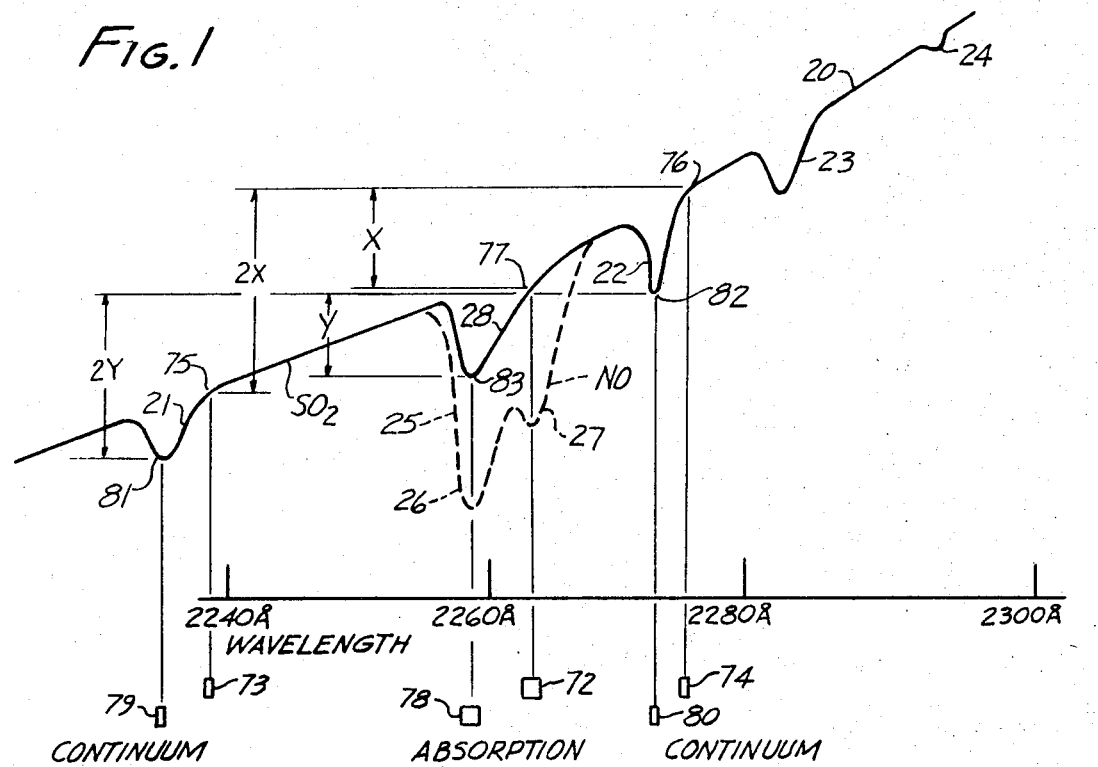
FIG. 1 is an illustration of a waveform showing certain characteristics of sulfur dioxide ($SO_2$) and nitric oxide (NO) and illustrating certain principles of the present invention.

With reference to FIG. 1, there is illustrated a diagram of a waveform 20 having valleys 21, 22, 23 and 24. Waveform 20 corresponds to the spectral signature for sulfur dioxide ($SO_2$) in the region between about 2240 and 2300 Angstroms, and valleys 21, 22, 23 and 24 indicate absorption lines in the spectrum for sulfur dioxide. Waveform 25 is superimposed on waveform 20, and except in the region of about 2260 Angstroms, waveform 25 substantially exactly follows waveform 20. Waveform 25 corresponds to the spectral signature for nitric oxide (NO). Waveform 25, like waveform 20 includes valleys 21, 22, 23 and 24 but also includes valleys 26 and 27. Valley 27 occurs at about the same frequency as valley 28 on waveform 20.

FIG. 2 is a perspective diagram of spectrometric apparatus for detecting particular materials in a sample, and is particularly applicable for detection of nitric oxide, although the same technique may be utilized for other substances as well. A broad band source of radiation 29 is passed through a region 30 containing the sample to be analyzed, and radiation from region 30 is reflected by mirrors 31 and 32 along path 33 through aperture 34 in mirror 31. An inlet chopper 35 is provided with an aperture 36 and a vane 37 adapted to reciprocate so as to alternately open and close aperture 36 to radiation path 33. The frequency of reciprocation of vane 37 is adjusted to some known frequency, for example 800 cycles per second. Thus, chopper 35 chops radiation along path 33 at a rate dependent upon reciprocation of vane 37, thereby passing pulsating radiation which pulsates at a predetermined frequency, for example 800 cps.

The pulsating radiation is reflected by collimating mirror 38 toward spectrometric grating 39. Grating 39 disperses the entire beam as to form a spectrum of radiation including absorption lines representative of the constituent parts of the material in region 30. The image of the spectral lines appearing on grating 39 is reflected by camera mirror 40 so that images of absorption lines are directed through aperture 41 and images of continuum are directed through aperture 42 of chopper 43. Vane 44 alternatively reciprocates between a first position blocking radiation through aperture 41 and a second position blocking radiation through aperture 42. The frequency of reciprocation of vane 44 is distinctive from that of vane 37 on the inlet chopper. It is preferred that the frequency of reciprocation of vanes 37 and 44 be adjusted so that neither vane reciprocates at the same frequency as the other, nor that the frequencies of reciprocation have similar fundamentals.

The operation of chopper 43 is such as alternately pass images of continuum and images of absorption, the rate of alternation between continuum and absorption being dependent upon the frequency of reciprocation of vane 44. The alternating radiation passed by chopper 43 impinges detector 45 which produces an output electrical signal on lead 45a, which signal reciprocates between two levels at the frequency of reciprocation of vane 44. The two levels associated with the output signal from detector 45 are representative of the intensity of the absorption radiation and continuum radiation, respectively. Vane 44 may be adjusted to a frequency of about 40 cycles so that during one-half cycle of vane 44 radiation at the absorption frequency is passed through aperture 41, and during the other half cycle radiation at the continuum frequency is passed through aperture 42.

FIG. 3 illustrates a waveform of an electric signal derived by detector 45 using the apparatus illustrated in FIG. 2. By way of example, detector 45 may be any suitable photo-electric or photo-resistive cell whose electrical characteristics vary in accordance with the intensity of impinging radiation. The electric signal derived by cell 45 by virtue of the alternately impinging radiation for the continuum and absorption appears as an alternating signal having a frequency of 800 cps modulated by a 40 cps signal. Thus, during one-half cycle as illustrated at 46, the amplitude of the electric signal is dependent upon the intensity of radiation in the continuum, and during the other half cycle as illustrated at 47, the amplitude of the electric signal is dependent upon the intensity of radiation at the absorption frequency.

Figure 6:
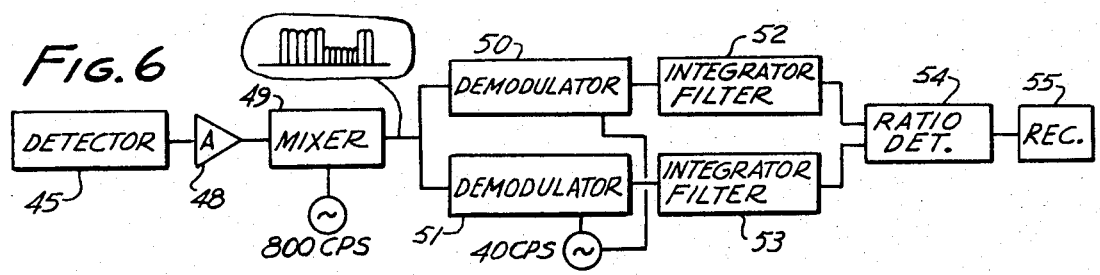
FIG. 6 is a block circuit diagram of electrical apparatus for use in connection with the apparatus illustrated in FIG. 2.

FIG. 6 is a block circuit diagram of electrical apparatus for analyzing the electric signal illustrated in FIG. 3. Detector 45 receives the impinging radiation from the apparatus illustred in FIG. 2, and an electrical signal similar to that illustrated in FIG. 3 is developed by detector 45. The signal is amplified by amplifier 48, and the amplified signal is mixed by mixer 49 with a 800 cycle signal, corresponding to the frequency of reciprocation of vane 37 of chopper 45. In practice, chopper 35 may be connected directly to the same source of signal utilized with the mixer. Mixer 49 shifts each negative half cycle of the 800 cps signal to a positive half cycle so that all of the peaks of the signal are positive. The amplitude of the peaks vary between two distinct levels at the rate of 40 cps.

The output of mixer 49 is fed to demodulators 50 and 51 which are demodulated by a 40 cps source. One of the demodulators, for example demodulator 50, includes a 180° phase shifter so that each demodulator demodulates separate half cycles of the 40 cps signal. Hence, demodulator 50 passes the mixed 800 cps signal corresponding to the level of radiation of absorption while demodulator 51 passes the mixed 800 cps signal corresponding to the level of radiation of the continuum. In practice the source of demodulation (40 cps) may be connected directly to chopper 43 so that chopper 43 and demodulators 50 and 51 operate in synchronism.

The resulting output signal from demodulators 50 and 51 are integrated and filtered by integrator-filters 52 and 53 to derive D.C. voltage levels having amplitudes dependent upon the intensity of radiation. Thus, the output from integrator-filter 52 is a D.C. signal having a voltage level dependent upon the intensity of the absorption radiation passed by chopper 43, whereas the output from integrator-filter 53 is a D.C. signal having a voltage level dependent upon the intensity of continuum radiation passed by chopper 43. The two D.C. signals are fed to ratio detector 54 which determines the ratio between the continuum and absorption radiation, and provides a useable output signal representative of the amount of a particular material within region 30. Recorder 55 may be connected to the output of ratio detector 54 for recording a permanent record of the output of ratio detector 54.

Figures 4, 5:
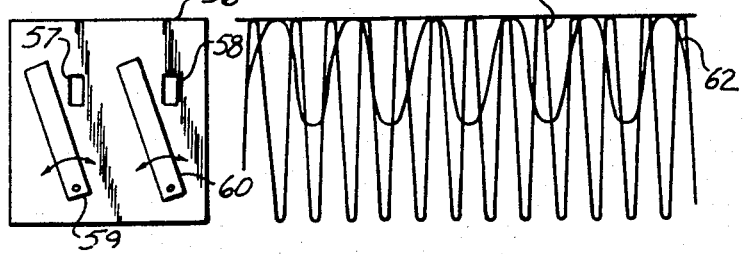
FIG. 4 is a planar view of an output mask for use in the apparatus illustrated in FIG. 2 in accordance with a modification of the present invention.
FIG. 5 is a representation of an electric signal derived by use of the mask illustrated in FIG. 4 with the apparatus shown in FIG. 2.

FIG. 4 illustrates a modification of the apparatus illustrated in FIG. 2, wherein chopper 35 may be eliminated and chopper 56 may be substituted for chopper 43. Thus, unchopped radiation is directed to the output chopper 56 which includes a pair of apertures 57 and 58 for passage of images of continuum and absorption, respectively. Vanes 59 and 60 are independently operated to alternatively block and pass radiation passing through apertures 57 and 58, respectively, at different frequencies, and preferably at frequencies not having similar fundamentals. For example, vane 59 may be reciprocated at 800 cps and vane 60 may be reciprocated at 300 cps.

The radiation passing through apertures 57 and 58 impinge detector 45 which derives at a complex electric signal whose component parts are illustrated in FIG. 5. The electric signal derived by detector 45 includes a first component illustrated by waveform 61 having a frequency of 800 cps and having an intensity dependent upon the intensity of the continuum passed by aperture 57, and a second component illustrated by waveform 62 having a frequency of 300 cps and having a level dependent upon the intensity of the absorption passed by aperture 58.

Figure 7:
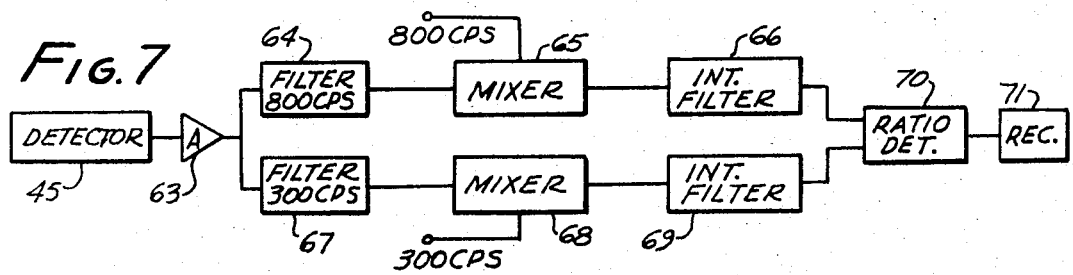
FIG. 7 is a block circuit diagram of electrical apparatus for use with the apparatus illustrated in FIG. 2 when modified utilizing the mask illustrated in FIG. 4.

FIG. 7 illustrates electrical apparatus for analyzing the signal illustrated in FIG. 5. The signal is amplified by amplifier 63 and split into two paths, one path passing through filter 64, mixer 65 and integrator-filter 66, while the other path passes through filter 67, mixer 68 and integrator-filter 69. Filter 64 is a bandpass filter and passes only the 800 cps signal. The signal is thereafter mixed by mixer 64 with an 800 cps signal to reverse the polarity of all negative half cycles. The output of mixer 65 is integrated and filtered by integrator-filter 66 to derive a D.C. signal having voltage level dependent upon the intensity of the continuum radiation passed by aperture 57. Likewise, filter 67 is a bandpass filter and passes only the 300 cps signal, which is mixed by mixer 68 with a 300 cps signal to reverse the polarity of all negative half cycles. The output of mixer 68 is fed to integrator-filter 69 to integrate and filter the signal to derive a D.C. signal having voltage level dependent upon the intensity of absorption radiation passed by aperture 58. The D.C. voltage levels derived by integrator-filters 66 and 69 are applied to ratio detector 70 where the ratio between continuum and absorption radiation is determined. The output of ratio detector 70 may be applied to a suitable recorder 71 to record a permanent record of the result. As in the case of FIG. 6, the mixing signals for mixers 65 and 68 may be utilized for operating vanes 59 and 60.

One problem in the monitoring for specific materials is illustrated in FIG. 1. Ordinarily, the intensity of the background radiation is not constant over the entire spectrum. Hence, as illustrated in FIG. 1, at lower frequencies the background radiation may have a lower intensity than the background radiation at higher frequencies. This phenomenon has lead to error in prior analysis apparatus in that previously it had been assumed that the intensity of background radiation was the same for all frequencies. Consequently, it had been the practice to measure the background radiation in the continuum and assume it to be the same as the background radiation at the absorption frequency. The assumption, which is ordinarily erroneous, has lead to erroneous measurements of intensity at the absorption frequency, resulting in an erroneous measurement of the quantity of material present in the sample. One feature of the present invention resides in the provision of a technique whereby the background radiation is measured at a minimum of two locations in the continuum, one above the suspected background radiation intensity at the absorption frequency, and the other below the suspected background radiation intensity at the absorption frequency.

As illustrated in FIG. 1, the intensity of radiation is shown to be generally increasing as the wavelength increases. By measuring the background radiation at the continuum through several apertures, both above and below the absorption frequency, and by averaging the intensity of the measured continuum radiation at the various points, the background radiation at the absorption frequency can be closely approximated. Hence, as illustrated in FIG. 1 the radiation of the absorption frequency passes through slit aperture 72, and the background radiation in the continuum passes through slit apertures 73 and 74. Slit apertures 73 and 74, which are output slit apertures for the apparatus illustrated in FIG. 2, measure the radiation intensity in the continuum at points 75 and 76 on the waveform. Point 77 is representative of the background radiation at the absorption frequency. (it should be noted that the waveform of all radiation will follow the dashed line, and point 77 is merely representative of the intensity of the background radiation with respect to the background radiation at points 75 and 76.) By averaging the intensities of radiation passed through slit apertures 73 and 74, the intensity of the background radiation at the absorption frequency may be approximated.

The location of slit apertures 73 and 74 may, or may not, be equally spaced from aperture 72, depending upon the change of slope of the curve of background radiation intensity. The locations of slit apertures 73 and 74 are chosen, however, so that they will pass background intensities which are different from the expected background intensity by equal amounts. Hence, aperture 73 passes radiation at a wavelength whose intensity is below the expected intensity of background radiation at the absorption wavelength by a predetermined amount and aperture 74 passes radiation at a wavelength whose intensity is above the expected background intensity at the absorption wavelength by the same predetermined amounts. The location and identities of the wavelengths for slit apertures 73 and 74 may be determined experimentally, or from standard charts of spectral analysis, well known in the art.

One aspect of the present invention resides in the detection of nitric oxide (NO) without first converting it to nitrogen dioxide ($NO_2$). FIG. 1 shows the waveforms for nitric oxide (NO) and sulfur dioxide ($SO_2$) is superimposed positions. Of course, if both NO and $SO_2$ were present in a sample, the combined curve would be similar to the NO curve and the intensity of radiation at wavelengths between about 2259 and 2269 Angstroms would be largely dependent upon the amount of NO present and the background radiation. Hence, slit aperture 72 passes radiation whose intensity is dependent upon the amount of NO present in the sample, as detected on peak 27, and the amount of background radiation. To eliminate the effects of the background radiation, slit apertures 73 and 74 pass only a region of the continuum associated with the background radiation at intensities both above and below that of the background radiation at the absorption frequency. The radiation intensities passed by slit apertures 73 and 74 may be averaged, and the result, which approximates the background radiation intensity at peak 27, may be compared to the radiation intensity passed by slit aperture 72. The wavelengths passed by slits 73 and 74 preferably are within the range of 5 to 50 Angstroms of the wavelength passed by slit 72.

Slit apertures 78-80 accomplish the same result, except that slit aperture 78 passes radiation at absorption peak 26 of the NO waveform and peak 83 of the $SO_2$ waveform while slit apertures 79 and 80 pass radiation at frequencies appearing at peaks 81 and 82, respectively of both the NO and $SO_2$ waveforms. The effect of peak 83 on the $SO_2$ waveform is cancelled out by the passage of radiation at the frequencies associated with peaks 81 and 82 of the $SO_2$ waveform.

Although the intensity of the background radiation may vary randomly over a range of frequencies, it may be assumed, for relatively small ranges of frequencies, that the intensity of background radiation varies linearly. Hence, by measuring the intensity of radiation at an absorption or emission wavelength $\lambda$, the background radiation at $\lambda$ can be measured by averaging the intensity of radiation at wavelengths equally spaced from $\lambda$ and both above and below $\lambda$.

For more accurate measurements, it is preferred to determine the rate of change of the slope of the curve of the background intensity and measure the intensity at wavelengths above and below that of the absorption line to obtain an average which closely approximates the intensity of background radiation at the absorption frequency. In any case, it is preferred that either both or neither of the wavelengths measured for purposes of determining background radiation appear at absorption frequencies of other materials.

To average the intensity of the radiation passed by the slit apertures associated with the continuum, it is desirable to maintain the total area of all slit apertures passing radiation in the continuum equal to the total area of all slit apertures for passing radiation on the absorption lines. Hence, where a single aperture is utilized for passage of radiation in the absorption band, the combined area of the slit apertures associated with the continuum should be equal to the area of the slit aperture for the absorption band. It is to be understood, and as taught in the aforementioned application of Egan et al., that the absorption radiation may be detected at several points on the waveform in accordance with a plurality of absorption lines.

FIGS. 8–11 illustrate an exit mask arrangement for passing radiation in an absorption band in one position of the mask and for passing radiation in adjacent continuum bands in a second position of the mask. As illustrated in FIGS. 8–11, mask 85 is provided with slit apertures 86 and 87 for passage of regions of continuum and is also provided with slit aperture 88 for passage of radiation at a predetermined absorption frequency. Slit aperture 88 is disposed between slit apertures 86 and 87, and has twice the area of either slit aperture 86 or 87 so that the total area of slit apertures 86 and 87 equals the total area of slit aperture 88. Vane 89 is mounted to L-shaped member 90 having a leg mounted to the vane normal to its surface and having a downwardly depending leg 91 supported by pivot point 92. Leg 91 terminates at the center point of the center leg of U-shaped member 93 whose rearwardly extending legs 94 and 95 extend into coils 96 and 97. As will be more fully understood hereinafter, U-shaped member 93 is preferably a tuned fork, tuned to reciprocate at a fixed frequency, for example 40 cycles per second.

The mask arrangement illustrated in FIGS. 8–11 may be utilized in place of mask 43 illustrated in FIG. 2. In operation, one coil, for example coil 96 is connected to the output of amplifier 96a. Amplifier 96a has its inputs connected to the other coil, for example coil 97 and to power supply 96b. Conductor 96c is connected to the output of amplifier 96a for connection to demodulators 50 and 51 in FIG. 6. Alternatively, a connection may be made from each coil 96 and 97 to a respective demodulation.

When power supply 96b is rendered operative, a current surge through amplifier 96a imposes an excitation current in coil 96 causing leg 94 of tuned fork 93 to be drawn into the coil. Fork 93 is urged into vibration at the tuned frequency, for example 40 cps, and during each reciprocation of the fork leg 95 is urged into coil 96 thereby generating a current in coil 97 which is delivered to amplifier 96a. Amplifier 96a amplifies the 40 cps current from coil 97 and imposes the amplified signal on coil 96 to keep fork 93 vibrating and on demodulators 50 and 51. This arrangement assures that demodulating signal imposed on demodulators 50 and 51 are at the identical frequency and phase as the frequency of reciprocation of vane 89.

Vane 89 is positioned so as to rock between the two positions illustrated in FIGS. 8 and 9 so that in one position, illustrated in FIG. 8, radiation from the continuum passes through aperture 86 in mask 85 to a detector (not shown in FIGS. 8-11) and radiation passes through aperture 87 in the mask and aperture 100 in vane 89 to the detector. In the second position of the vane, illustrated in FIG. 9, the vane blocks passage of radiation through both apertures 86 and 87, but radiation is permitted to pass through apertures 88 and 100 to the detector. Stop means (not shown) may be provided to locate the two positions of vane 89. Also, by adjusting the output of power supply 96b, the signal amplitude to coil 96 may be adjusted, thereby adjusting the extent of motion of vane 89.

FIGS. 12 and 13 illustrate a method of adjusting the paths of radiation from a grating to output slit apertures for detection by a detector. Particularly, and as illustrated in FIGS. 12 and 13, radiation enters through an input mask or chopper 101 and is reflected by mirror 102 to the grating 103. Grating 103 displays lines of absorption associated with the material being monitored, and images of those lines are reflected by mirrors 104 and 105 to output aperture or shutter 106 for display on detector 107. It sometimes occurs, and particularly in the detection of nitrogen dioxide ($NO_2$) that the spectral signature is a wide band signature with the identifying absorption lines occurring at greatly displaced regions on the grating. Accordingly, several mirrors, 104 and 105 are necessary in order to direct the images of the absorption lines to the output slit aperture means 107.

Heretofore, one problem associated in the monitoring of the nitrogen dioxide has arisen by virtue of the fact that long radiation paths exist between the grating and the output shutter by way of the directional mirrors. Prior spectrometric apparatus have experienced interference between the crossing paths of the various frequencies which results in a dispersion of the intensities thereby resulting in unreliable data. To cure this, one of the mirrors, for example, mirror 105, is directed slightly downwardly so that the path of radiation from the grating is directed beneath the path of radiation between mirror 104 and the output shutter 107 to avoid interference of radiation.

One aspect of the present invention resides in the use of a spectrometer to monitor exhaust gases from a furnace of the like, to determine the amount and types of pollutants being discharged into the atmosphere. One problem in using a spectrometer as a stack monitor resides in the fact that noxious and corrosive materials in the exhaust fumes could affect the window assembly for the spectrometer, thereby affecting its monitoring capabilities. Accordingly, one aspect of this invention resides in the provision of a window assembly having means for preventing noxious and corrosive materials in the exhaust gases from attacking the window assembly.

FIGS. 14–19 illustrate apparatus for use in a stack monitor, and the like, which maintains the detector substantially clear from debris or other contaminants which may affect the operation of the detector, and which permits removal of a viewing means for cleaning of the viewer without requiring shut-down of the apparatus being monitored. In FIGS. 14–19, a substantially cylindrical housing portion 110 is mounted in the wall 111 of a stack or flue through which fluids or gases to be monitored are passing. For example, the gas may be directed through the region 112 in the direction of arrow 113. Housing portion 114 having an opening 115 providing communication between housing portions 110 and 114, is mounted to housing portion 110 and includes a blower 116 at the upper portion of chamber 117. Within the rear wall 118 of the housing is window assembly 120.

Window assembly 120 is arranged in sliding engagement within a slot 121 which is closed by plate 122. Aperture 123 in plate 122 permits direct viewing between window assembly 120, through chamber 117, aperture 115 and cylindrical housing 110 to the interior of flue 111. Plate 124 is mounted to the interior of wall 111 of the flue and forms a forward wall member lying against the stack wall, and includes an aperture 125 through which the sample in region 112 may be viewed by window assembly 120. The forward face of plate 124 at the downstream edge of aperture 125 and in communication with this aperture, is provided with a slit or recess 126 at the forward face of the plate 124 to reduce turbulence of gases in region 112 passing aperture 125 and to provide an exit for air passing through housing 110 in the direction of arrow 127 under the influence of blower 116. The recess 126 recedes rearwardly from the forward face of plate 124 in the downstream direction. Slit 126 is provided so that air and exhaust fumes do not intermix and the flow of exhaust gases is not affected by the air. The effect of recess 126 is such as to form a fluid barrier between the converging streams of gas following arrows 113 and 127. The fluid interface between the two streams is accurately defined, thereby providing an accurate positioning of the location of the sample passing through region 112.

Window assembly 120 comprises a window slide body 128 having a stop 129 at one end thereof and a handle 130 at the opposite end thereof. A substantially circular aperture 131 is disposed within slide 128, and transparent window 132 is disposed within aperture 131 in sealing relation. O-ring seals 133 and 134 are disposed on each side of window slide 118 and is adapted to engage and seal against slot 121 in housing 114. Substantially circular aperture 135 is provided in rear wall 118 adjacent one position of window 132.

In operation of the apparatus illustrated in FIGS 14–19, blower 116 forces air in the direction of arrow 127 which passes through aperture 125 to join with the exhaust gases following arrow 113 to form a fluid barrier in region 112 in the path between apparatus 136 and region 112. The flow of air through aperture 125 is adjusted so that it is slightly higher than the pressure in region 112. Window assembly 128 is assembled within slot 121 so that window 133 is positioned directly between apparatus 136 and region 112. By way of example, apparatus 136 may be an input chopper or other suitable optical input device for the apparatus illustrated in FIG. 2. If it becomes necessary to clean window 133, handle 130 is pulled (to the left as illustrated in FIGS. 17 and 18) until stop 129 bears against housing 144, thereby exposing window 132 outside of housing 114 to permit cleaning of the window. After the window is cleaned, the window assembly may be slid back to the position illustrated in FIG. 17 so that window 132 is again positioned permitting apparatus 136 to again view region 112.

The window assembly illustrated in FIGS. 14-19 is useful for any type of stack monitor, such as a spectrometer or opacity meter, or the like.

The present invention thus provides spectrometric apparatus for determining the quantity of and presence of particular materials in a sample. The apparatus is effective in use and provides accurate measurement of the quantity of particular materials while providing rugged operation over a useful life. The apparatus accurately monitors the presence of and quantity of particular materials in fluids. The apparatus is particularly useful as a stack monitor for monitoring pollutants emitted into the atmosphere through a stack or flue.

This invention is not to be limited by the embodiments as shown in the drawings and described in the description which are given by way of example and not of limitation, but only in accordance with the scope of the appended claims.

What is claimed is:

1. A window assembly for use with a stack monitor for monitoring materials present in fluid flowing through the stack, said window assembly comprising housing means having a forward wall containing a first aperture and a rear wall containing a second aperture, said first aperture being adapted to be positioned in fluid communication with a region of the stack through which said fluid flows; a recess in the forward face of said forward wall, in communication with a downstream edge of said first aperture; said rear wall containing a slot at said second aperture so that there is provided a line of sight through said first and second apertures slide means having a body and a transparent portion, said slide means being slidably engaged in said slot and slidably movable between a first position wherein said transparent portion is positioned between said first and second apertures, and a second position wherein said body blocks the line of sight between said first and second apertures and blower means connected with said housing for directing fluid through said first aperture into said region, whereby fluid flowing from the housing through said first aperture forms a fluid barrier in said stack region with fluid flowing through said stack of said region, and fluid turbulence is reduced.

2. Apparatus according to claim 1 further including seal means providing a fluid seal between said slide means and said housing in said slot.

3. A window assembly according to claim 1 in which said recess recedes rearwardly in the direction of fluid flow through said stack.

* * * * *

UNITED STATES PATENT OFFICE
CERTIFICATE OF CORRECTION

Patent No. 3,836,237   Dated September 17, 1974

Inventor(s) DALE W. EGAN et al

It is certified that error appears in the above-identified patent and that said Letters Patent are hereby corrected as shown below:

Related U.S. Application Data

"July 1, 1974" should read --July 1, 1971--

| | | |
|---|---|---|
| Col. 3, line 55, | "invention:" should read | --invention;-- |
| Col. 6, line 54, | "64" should read | --65-- |
| Col. 8, line 7, | "is" should read | --in-- |
| Col. 9, line 41, | "96" should read | --97-- |
| Col. 11, line 8, | after "that" insert | --the-- |
| Col. 11, line 34, | "133" should read | --132-- |
| Col. 11, line 39, | "133" should read | --132-- |
| Col. 11, line 41, | "144" should read | --114-- |

Signed and sealed this 17th day of December 1974.

(SEAL)
Attest:

McCOY M. GIBSON JR.
Attesting Officer

C. MARSHALL DANN
Commissioner of Patents